Feb. 8, 1966     G. H. MILLS     3,233,456
WIND INDICATOR

Filed Nov. 13, 1963     4 Sheets-Sheet 1

INVENTOR
Gordon H. Mills

BY Wilkinson, Mawhinney & Theibault
ATTORNEYS

Feb. 8, 1966 G. H. MILLS 3,233,456
WIND INDICATOR
Filed Nov. 13, 1963 4 Sheets-Sheet 2

INVENTOR
Gordon H. Mills

BY
Wilkinson, Mawhinney & Theibault
ATTORNEYS

Feb. 8, 1966 G. H. MILLS 3,233,456
WIND INDICATOR

Filed Nov. 13, 1963 4 Sheets-Sheet 3

INVENTOR
Gordon H. Mills

BY Wilkinson, Mawhinney & Theibault
ATTORNEYS

Feb. 8, 1966　　　G. H. MILLS　　　3,233,456
WIND INDICATOR
Filed Nov. 13, 1963　　　4 Sheets-Sheet 4

INVENTOR
Gordon H. Mills

BY Wilkinson, Mawhinney & Theibault
ATTORNEYS

United States Patent Office 3,233,456
Patented Feb. 8, 1966

3,233,456
WIND INDICATOR
Gordon H. Mills, 2508 Janice Drive, Austin 3, Tex.
Filed Nov. 13, 1963, Ser. No. 323,459
2 Claims. (Cl. 73—188)

The present invention relates to wind indicator and has for an object to provide a duplex indicator for greater accuracy and focusing closer attention to wind direction conditions in which preferably duplicate air vanes operate independently but in closely grouped association to lend attractiveness as well as utility to the science of detection of wind directions.

The invention further has educational aspects by which the activities of the two wind vanes will incite in young people wonder and the desire to more thoroughly understand wind reactions and the detection of true wind directions.

The invention also has for a further object to provide a commercial adaptation conforming to the above-stated objects and purposes which may be reasonably priced, compactly constructed and easily installed as well as functioning in strictly correct maneuvers incident to reaction with the wind in its various changing aspects.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
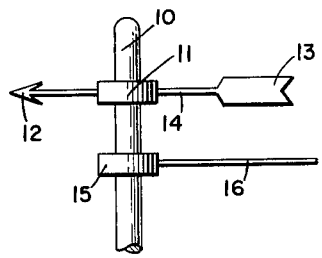
FIGURES 1 and 2 are side elevational views with the support partly broken away and showing one form of the invention.

Referring more particularly to the drawings, and at the present to that form of the invention shown in FIGURES 1, 2 and 3, 10 indicates a vertical support or mast having a substantially vertical axis about which is mounted a first air vane and a second air vane.

The first air vane may be of a conventional form fitted to rotate horizontally about a bearing 11 fitted to the support 10 and carrying the shaft 14 which terminates at one end in the pointer or index 12 and at the other end in one or more vane blades 13 adapted in customary manner to receive on the sides thereof the wind currents to automatically rotate the conventional first air vane in a horizontal plane about the vertical axis of the support 10 in a manner to cause the index or pointer 12 to point in the direction of the oncoming wind current.

Associated with the support 10 and carried thereby is a second horizontally rotating bearing 15 to which horizontal arm 16 is attached for carrying at its outer end a body member 17 of a second air vane, which body member is preferably in the miniature form of a hull of a model sailboat of which 18 is the bow or prow, functioning as the pointer or index and one or more blades 19, 20 in imitation and form of close-hauled sails.

Figure 2:
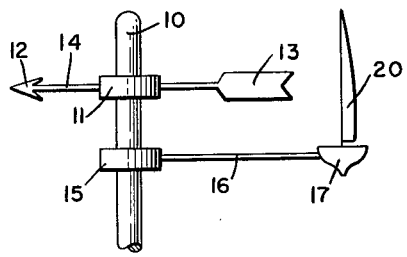

According to the form of the invention shown in FIGURES 1, 2 and 3, the bearing 15 and the horizontal arm 16 may be disposed in spaced relation below the first conventional air vane. Where the sail blades 19, 20 are as vertically high as illustrated in FIGURE 2, the arm 16 will be of sufficient length to space the second air vane outwardly remote from the axis of the support 10 in a sufficiently offset relation so as to clear the first air vane so as not to interfere with the independent functions of both air vanes.

It will be understood that the arm 16 is rigid and that its outer end is rigidly affixed to the body member or hull 17 at an intermediate portion relative to the length of such body member. Such arm will extend from the side of the body member 17 to a substantially perpendicular or right angle relationship. Otherwise stated, the arm 16 is substantially normal to a right line connecting the bow 18 with the stern of the hull 17.

It will be noted that a significant difference exists in structure and function between the two air vanes inasmuch as the index 12 and blade 13 of the first air vane are to opposite sides of the vertical axis of the support 10 so that the incidence of wind against the blade 13 will cause angular displacement of the pointer 12 and blade 13 in relatively opposite directions although in the same rotational aspect; whereas in the case of the second air vane, due to the fact that the pointer 18 and the blades 19 and 20 are all carried by a single arm 16 at one side only of the support 10, such index 18 and the blades 19, 20 will all move together as a unit through the same angle of displacement about the vertical axis of 10 so that the action of the two air vanes is substantially different.

As otherwise stated, the first air vane has simply a movement of rotation without any motion of translation while the second air vane 17 has a bodily movement in space incident to reaction of the wind currents against its close-hauled blades or sails and, therefore, the model sailboat will sail into the wind in the manner of sail boats sailing in the water when the sails are close-hauled.

Figure 3:
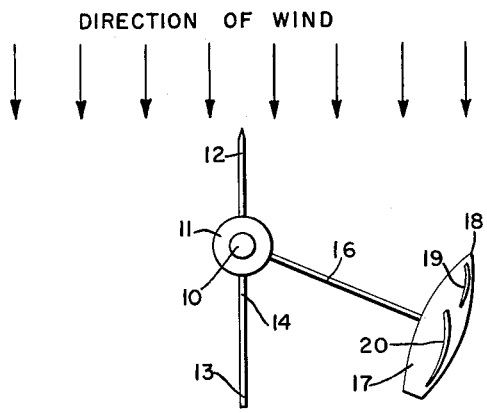
FIGURE 3 is a top plan view of the same, showing the incidence of wind currents establishing reactionary operative positions of the two air vanes.

FIGURE 3 shows generally the relative positions of the two air vanes when the boat is sailing into the wind, this figure indicating by the arrows the direction of wind incidence. This FIGURE 3 also shows the cambered airfoil form of the blades 19, 20.

Figure 4:
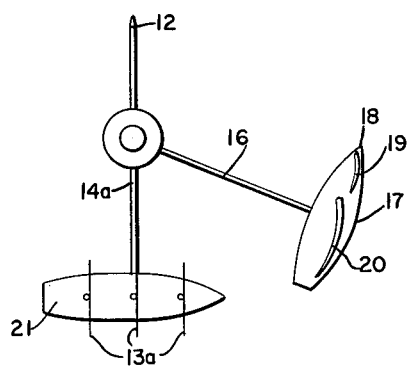
FIGURE 4 is a top plan view of a slightly modified form of the invention.
Figure 5:
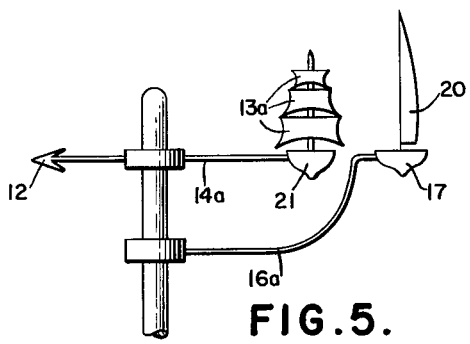
FIGURE 5 is a side elevational view of the same.

Referring more particularly to FIGURES 4 and 5, instead of the conventional blade 13 of the first air vane, a number of vanes 13ª may be provided in imitation of the sails of a square-rigged sailing ship, the hull 21 of which lengthwise is at substantially ninety degrees to the supporting rod or shaft 14ª. The sails 13ª are flat to act as blades or vanes.

As appears in FIGURE 4, with the airfoil member 17 made in the likeness of a close-hauled sloop (or schooner, yawl, ketch, etc.), the square-rigged ship 21 gives the impression of pursuing the sloop 17.

As shown in FIGURE 5 the rod or arm 16ª should be bent to permit the sloop 17 to revolve past the square-rigged ship 21 while both are at substantially the same level.

Figure 6:
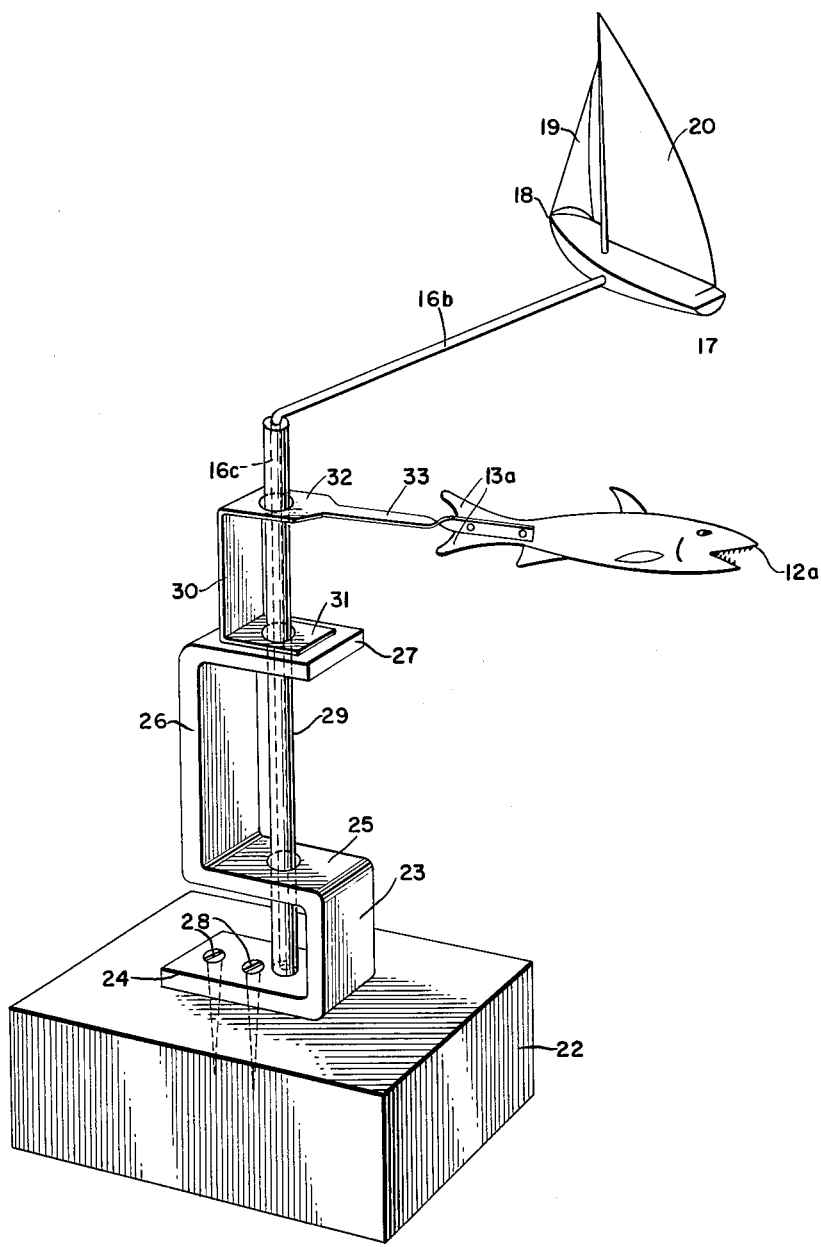
FIGURE 6 is a perspective view of a further modified form of the invention including a novel form of supporting means.

Instead of ships, various other models may be used, such as birds or airplanes. Different models can be combined such as a shark for the first air vane and a sloop for the airfoil as illustrated in FIGURE 6. Of course the conventional first air vane and the airfoils of the second air vane do not necessarily have to be designed to be representative of any other objects. To reduce wind resistance and weight, the bodies of whatever figures are used (e.g. the hulls of ships as distinguished from the sails) can be highly stylized or made in outline only.

The bearings employed may be of any variety.

The design of one working model, from among the many designs that can be used, appears in FIGURE 6.

In each case whatever the models used or the design, the principle is that there is a vane or vanes to indicate the true direction of the wind and an airfoil or airfoils to move into the wind, both revolving independently around the same vertical axis.

Referring more particularly to FIGURE 6, 22 designates a base which may be in the form of a wood block serving as a support for a bracket which may be in the form of two relatively reversed channel members of which 23 represents the web of the lower channel member and 24 and 25 the lower and upper flanges while 26 designates the web of the upper channel section, the flange 25 being common to the two channel sections and forming the lower flange of the upper section being substantially parallel to the upper horizontal flange 27 of such upper channel section.

Screws or other suitable fastenings 28 serve to firmly attach the lowermost flange to the base 22.

The flanges 25 and 27 have received therethrough a stainless steel or other tube 29, the lower end of which may simply rest upon the bottom flange 24 or this tube 29 may be affixed to the bracket or to any of the flanges thereof in case it is desired to avoid rotation of the tube. The arm 16$^b$ which supports the body member or hull 17 of the airfoil unit may be a horizontal extension of a stiff, stainless steel wire, the vertical component 16$^c$ of which turns freely inside the tube 29. In this instance a rotary bracket is provided for the first air vane, such bracket being preferably made from sheet aluminum and comprising a vertical web 30 from upper and lower ends of which extend the horizontal lower and upper flanges 31 and 32 being perforated to extend about and rotate about the tube 29 with the lower flange 31 supported upon the topmost flange 27 of the intermediate channel.

The upper flange 32 is extended into a supporting arm 33 to which is attached the first air vane which is shown to be in the form of a fish having an index or pointer 12$^a$ and blades 13$^a$. The lower bracket is preferably made of strap iron which will adequately sustain the weight of the two air vanes. The tube 29 may be free to turn inside the holes drilled through the strap iron.

Figure 7:
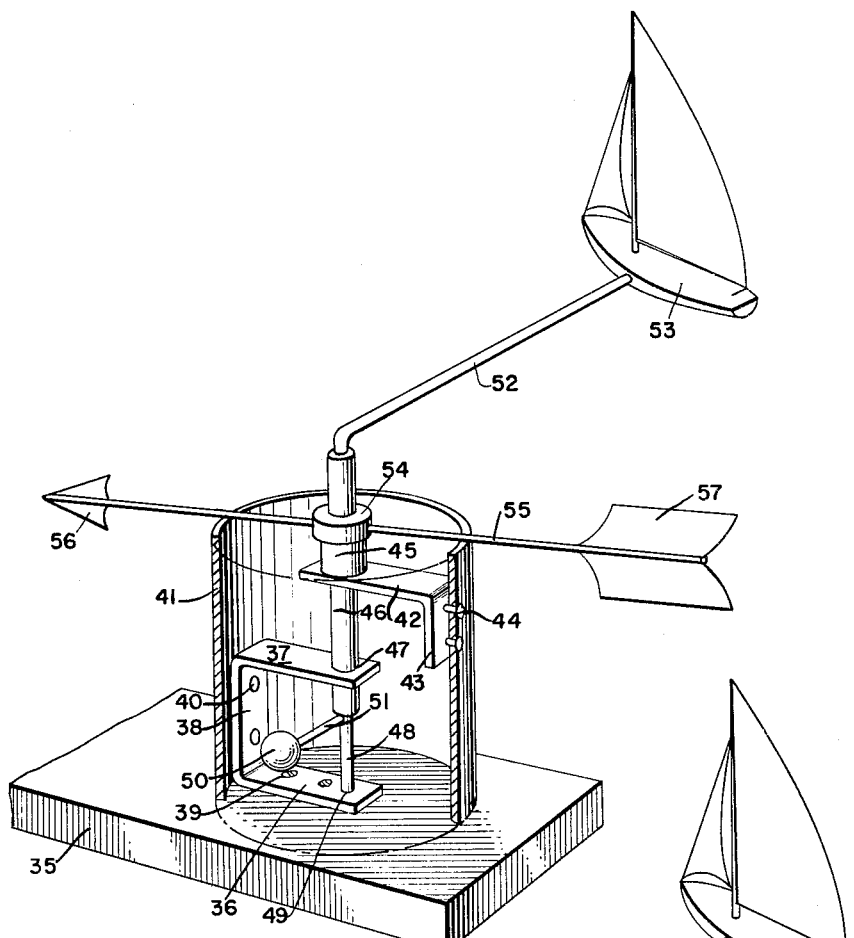
FIGURE 7 is a perspective view with parts broken away illustrating a modification in which a counterbalance is provided to the weight of the airfoil with a windshield for the counterbalance.

Referring more particularly to FIGURE 7, for models in which the airfoil is relatively heavy, it may be desirable to provide a counterbalance to the weight of the airfoil and a shield to prevent the wind from blowing on the counterbalance and thereby adversely affecting the motion of the airfoil.

In this FIGURE 7, 35 designates a base of wood or other material to which the lower horizontal flange 36 of a lower bracket is affixed by screws or other fastenings 39; such lower bracket having an upper flange 37 spaced horizontally above the lower flange 36 by a connecting vertical web 38 itself affixed as by rivets or other fastenings to a windshield or screen of cylindrical or other form which may be of any material and preferably open-ended with its lower end supported on the base 35.

An upper bracket 42 having a downturned flange 43 affixed by rivets or other fastenings 44 to the wall of the shield 41 laps the flange 37 of the lower bracket and through a collar 45 which rests on and above the upper bracket 42 and is affixed to a stainless steel or other tube 46 supports the tube and may if desired prevent rotation of the tube in which event the collar 45 is welded or otherwise affixed to the upper bracket 42.

The tube 46 at its lower end extends through an opening 47 in the flange 37 and terminates in spaced relation above the lower flange 36. A stainless steel or other rod or shaft 48 is rotatably mounted through the tube 46 having its lower end stepped in a bearing socket or opening 49 in the lower flange 36, and exposed below the lower end of the tube 46 to fixedly receive a stud 51 carrying a lead or other ball or counterweight 50 free to rotate with the shaft 48 incident to the circular movement of the second wind vane or airfoil 53 carried on the outer end of the arm 52 which may be a part of the rod or shaft 48.

The first wind vane is or may be comprised of the horizontal shaft 55, pointer 56 and blade 57, the shaft having a bearing 54 rotatable about the tube and supported on the collar 45.

Figure 8:
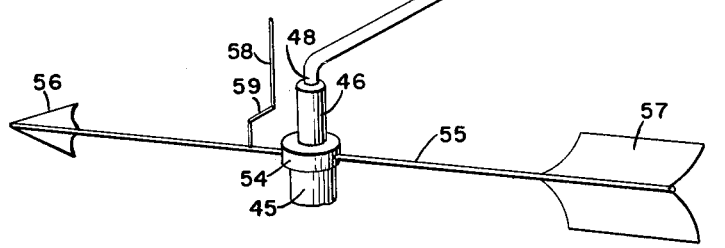
FIGURE 8 is a fragmentary perspective view of a combined wind vane and airfoil illustrating a stop member on the wind vane disposed in the path of movement of the airfoil assembly to prevent windmilling of the airfoil.

Referring to FIGURE 8, the parts are or may be as in FIGURE 7 with the addition of a stop member, one form of which is a thin rod 58 affixed to and upstanding from the horizontal shaft 55 of the first wind vane with an offset intermediate portion 59 to locate the upper part of the stop member or rod in the path of rotation of the arm 52 of the second wind vane or airfoil.

Without some such stop device the airfoil at times, due to erratic wind conditions, will make a series of rapid 360 degree revolutions while the first wind vane remains windbound. Such erratic behaviour may be undesirable. The stop rod will arrest such motion. When such action occurs the arm 52 will make contact with the more or less stationary rod 58 carried by the shaft 55 which, due to the blade or vane 57, will tend to resist the windmilling rotation of the airfoil. When contact is made between the arm 52 and the stop member 58 the first wind vane 55, 56, 57 will swing with the airfoil 53 through some angular distance before braking the action. However, the air pressure on the part 57 forces the whole system back into its normal position. In other words as the arm 52 of the airfoil reaches some predetermined point between zero and ninety degrees with the windward end of the horizontal shaft 55 of the first wind vane, the stop rod 58 intercepts the arm 52. After this interception only a little further windward motion of the airfoil (plus, now, the wind vane) can occur before air pressure on the wind vane stops the forward motion; and both rotating members then resume normal positions.

Figure 9:
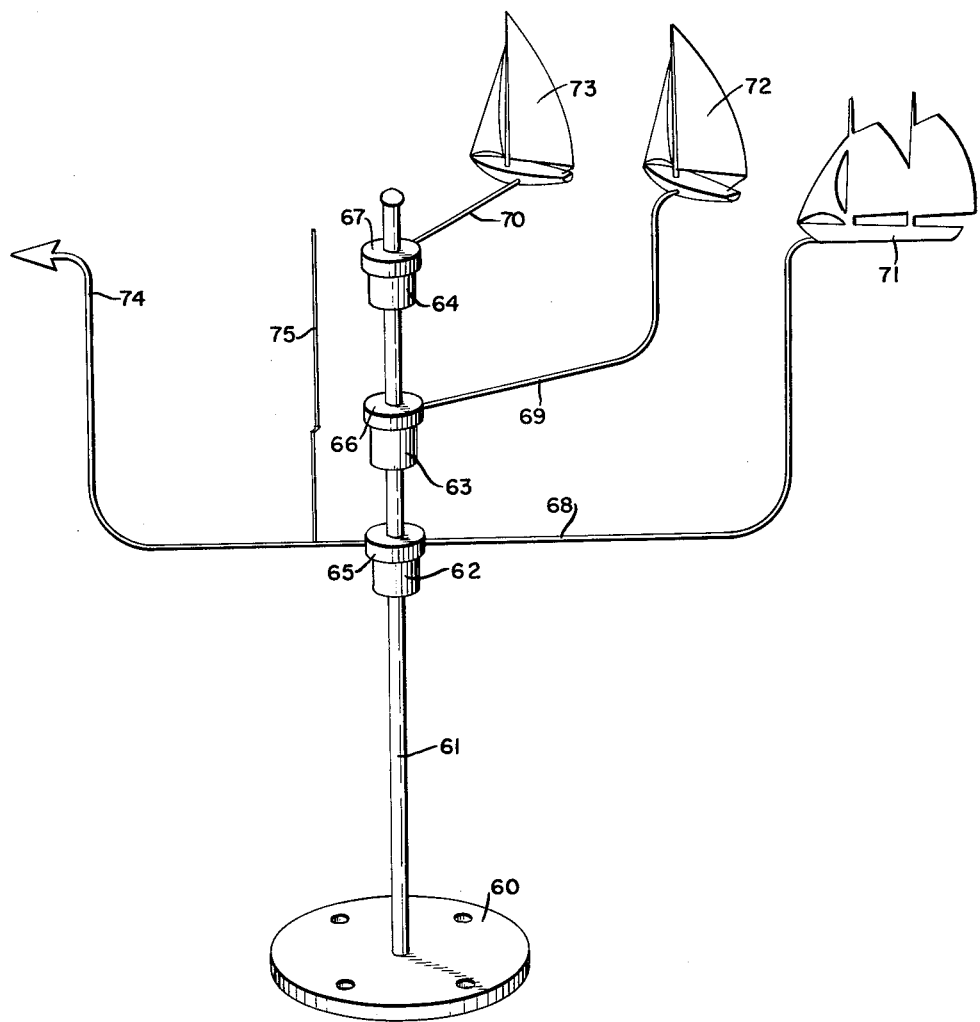
FIGURE 9 is also a perspective view of a further modification in which plural airfoils are employed with the wind vane in a unique assemblage.

Referring to FIGURE 9, 60 designates a baseplate to which is affixed an upright support 61 having the spaced fixed collars 62, 63 and 64 supporting thereon rotary bearings 65, 66 and 67 to which are respectively attached arms 68, 69 and 70 carrying a wind vane 71 and plural airfoils 72 and 73. The arm or shaft 68 has affixed thereto an index or pointer 74 and also carries at an appropriate point the stop member 75 so disposed as to intercept the arms 69 and 70 on undue rotation thereof.

This FIGURE 9 serves to indicate that more than one airfoil could be allowed to rotate around the same vertical shaft. That is, there could be two, three or more airfoils, and a wind vane, all rotating independently, without interfering with one another, about the same vertical shaft.

Although I have disclosed herein the best forms of the invention known to me at this time, I reserve the right to all such modifications and changes as may come within the scope of the following claims.

What is claimed is:

1. A wind directional indicating apparatus comprising
   (a) a support,
   (b) a first wind vane having a wind directional pointer and a tail blade,
   (c) means rotatably supporting said first wind vane for 360 degrees of rotation about the axis of said support and normal thereto,
   (d) a second wind vane including a body member in the form of the hull of a ship having a bow and a stern, (e) said second vane being connected to the hull of said ship at right angles to the longitudinal axis between the bow and stern thereof,
(f) said second vane being journaled to rotate about the axis of said support and being substantially normal thereto and coaxial with said first vane,
(g) a cambered sail upstanding from the hull of the ship carried by said second wind vane,
(h) said cambered sail being close-hauled relative to the longitudinal axis of the ship carried by said second vane from its bow to stern, and
(i) stop limit means projecting from said first vane forwardly of the pivot point of said first vane in the direction of the arrow, said limit stop being of a length to be engaged by and to arrest rotational movement of the second vane about the axis of said support whereby said second vane has restricted angular movement relative to said first vane of less than 360 degrees.

2. A wind vane as claimed in claim 1 further comprising
(j) counter weight means carried by said second wind vane and positioned to the side of the axis of pivot of said second vane from the ship carried by said second vane, and
(k) a wind shield circumferentially about said counter weight to avoid false windage indication of said second vane incident to air currents encountering said counter weight.

References Cited by the Examiner

UNITED STATES PATENTS

| | | | |
|---|---|---|---|
| 1,196,348 | 8/1916 | Gianini | 73—188 X |
| 1,223,643 | 4/1917 | Tilton | 64—53 |
| 1,450,278 | 4/1923 | Cave | 73—189 X |
| 2,227,918 | 1/1941 | Trombla | 46—53 |
| 2,270,120 | 1/1942 | Greene | 73—186 |
| 2,309,581 | 1/1943 | Erwin | 73—189 |
| 2,363,087 | 11/1944 | Salisbury | 73—188 |
| 2,478,967 | 8/1949 | Greene | 73—142 X |

FOREIGN PATENTS 1,031,548  6/1958  Germany.

RICHARD C. QUEISSER, *Primary Examiner.*

DAVID SCHONBERG, *Examiner.*